United States Patent
Penny et al.

(10) Patent No.: US 9,993,745 B2
(45) Date of Patent: Jun. 12, 2018

(54) BIO-MECHANICAL WASTESOLUTION TREATMENT SYSTEM

(71) Applicant: EnSolve Biosystems, Inc., Raleigh, NC (US)

(72) Inventors: Richard L. Penny, Hampstead, NC (US); Jason A. Caplan, Raleigh, NC (US); Marika Suominen-Yeh, Raleigh, NC (US)

(73) Assignee: EnSolve Biosystems, Inc., Raleigh, NC (US)

(*) Notice: Subject to any disclaimer, the term of this patent is extended or adjusted under 35 U.S.C. 154(b) by 0 days. days.

(21) Appl. No.: 13/650,259

(22) Filed: Oct. 12, 2012

(65) Prior Publication Data

US 2013/0098836 A1 Apr. 25, 2013

Related U.S. Application Data

(60) Provisional application No. 61/627,489, filed on Oct. 13, 2011.

(51) Int. Cl.
  C02F 3/00     (2006.01)
  C02F 9/14     (2006.01)
  (Continued)

(52) U.S. Cl.
  CPC ........... B01D 17/047 (2013.01); B01D 17/10 (2013.01)

(58) Field of Classification Search
  CPC .... C02F 3/34; C02F 3/343; C02F 3/10; C02F 1/238; C02F 1/38; C02F 9/00; C02F 2101/32; C02F 2301/008; C02F 2301/18; C02F 2203/001; C02F 2209/003; C02F 2209/10; C02F 2209/20; C02F 2209/21;
  (Continued)

(56) References Cited

U.S. PATENT DOCUMENTS 5,094,747 A * 3/1992 Johnson ........... B60K 15/03504
                                                210/266
5,702,604 A * 12/1997 Yamasaki ............. B01D 53/18
                                                210/151

(Continued)

*Primary Examiner* — Claire A Norris
(74) *Attorney, Agent, or Firm* — Kilpatrick Townsend & Stockton LLP

(57) ABSTRACT

Wastesolution treatment systems and methods are provided which may remove particulates and hydrocarbons from wastesolution. Embodiments may be used to treat scrubber wastesolution from exhaust gas cleaning ("EGC") systems. Some embodiments may be used with terrestrial EGC systems and others may be used for maritime ship EGC systems. Certain embodiments remove free phase oil and particulates from the wastesolution. Some embodiments may utilize a fixed film biogenerator cultured with hydrocarbon degrading microorganisms to reduce the concentration of oils in the water. Certain embodiments may utilize a biofilter with granulated activated carbon ("GAC") to adsorb contaminants in the water. Other embodiments may utilize GAC cultured with hydrocarbon degrading microorganisms to reduce oil concentration in the water. The wastesolution may be recirculated through the system until the measured contaminant concentration drops below a threshold value. The treated wastesolution may be stored, reused, or may be safely discharged from the system.

16 Claims, 3 Drawing Sheets

(51) Int. Cl.
*C02F 1/38* (2006.01)
*B01D 21/26* (2006.01)
*B01D 17/04* (2006.01)
*B01D 17/00* (2006.01)

(58) Field of Classification Search
CPC ... C02F 2301/046; B01D 17/02; B01D 21/26; B01D 21/02
USPC ....... 210/610, 611, 614, 631, 767, 781, 787, 210/800, 805, 252, 258, 294, 295, 61, 3, 210/195.1, 194, 29, 5, 613
See application file for complete search history.

(56) References Cited

U.S. PATENT DOCUMENTS

| | | | |
|---|---|---|---|
| 5,885,459 A * | 3/1999 | Lerche et al. | 210/602 |
| 6,342,159 B1 * | 1/2002 | Caplan et al. | 210/610 |
| 6,616,833 B2 * | 9/2003 | Lynch | 210/96.1 |
| 7,018,539 B2 * | 3/2006 | Mairal et al. | 210/651 |
| 2009/0090473 A1 * | 4/2009 | Fielding | B01D 17/0217 159/46 |

* cited by examiner

BIO-MECHANICAL WASTESOLUTION TREATMENT SYSTEM

CROSS-REFERENCES TO RELATED APPLICATIONS

This application claims the benefit of U.S. Provisional Application No. 61/627,489 filed on Oct. 13, 2011, the full disclosure of which is incorporated by reference.

BACKGROUND

Wet scrubber systems help reduce the amount of pollutants from exhaust gas streams by capturing and absorbing pollutants in a scrubbing liquid. Pollutants may include particulates such as dust particles or soot. Further, pollutants may include gaseous pollutants such as sulfur dioxide. In a wet scrubber system, the scrubbing liquid may be specifically configured to remove particular pollutants from the gas stream. In order for the scrubbing liquid to capture and absorb pollutants from the gas stream, the scrubbing liquid must contact the pollutants. In some systems, the scrubbing liquid contacts the pollutants in the gas stream by being sprayed into the gas stream. Other systems may force the gas stream through a pool of the scrubbing liquid. The scrubbing liquid may then reduce the pollutants in the gas stream. Thereafter, the treated gas stream may be released from the system with reduced adverse effects on the environment. Accordingly, wet scrubber systems are important devices which help minimize the amount of pollutants that are released into the air from various gas streams.

Although wet scrubber systems help reduce the amount of particulates and gaseous pollutants released into the air, a substantial amount of polluted scrubber wastesolution may be produced in such systems. The scrubber wastesolution from wet scrubber systems contains the pollutants which were removed from the gas stream and may pose a potential environmental risk if released untreated. The inventors of the present application have developed an efficient and effective way of reducing the concentration of pollutants from the wastesolution of wet scrubber systems. In addition, other solutions may be treated in a similar manner. The treated solution(s) may then be released into the environment with minimal adverse impact to the environment.

SUMMARY

Certain embodiments of the present invention generally relate to systems and methods of treating solutions, including aqueous solutions. Embodiments of the present invention may be particularly advantageous for treating scrubber wastesolutions produced, for example, in a wet scrubbing process wherein a scrubbing solution is utilized to wash materials, such as pollutants, from a gas stream. The resulting scrubber wastesolution comprises the initial scrubbing solution and materials washed from the gas stream. Scrubbing solutions are often aqueous, however may comprise, or also comprise reagents depending on the materials to be removed from a gas stream. The water component in an aqueous scrubbing solution may comprise fresh water, deionized water, potable or un-potable water, sea water, wastewater, bilge water, aqueous solutions, and the like, depending on the intended purpose.

In an embodiment of the present invention, a method of treating wastesolution from scrubber systems is provided. The method includes the step of receiving scrubber wastesolution and then the steps of reducing an amount of free phase oil and reducing a concentration of particulates in the received wastesolution. The method further includes the step of delivering the wastesolution to a biogenerator which utilizes cultured hydrocarbon degrading microorganisms to reduce a concentration of emulsified oil in the wastesolution. The method may further include a step of delivering the wastesolution to a granulated activated carbon filter. The granulated activated carbon filter may also reduce a concentration of contaminants from the wastesolution. Further, the granulated activated carbon filter may be cultured with hydrocarbon degrading microorganisms to reduce a concentration of emulsified oil in the wastesolution. The hydrocarbon degrading microorganisms of the granulated activated carbon filter may be seeded from the hydrocarbon degrading microorganisms utilized in the fixed film bioreactor.

The method of treating wastesolution may reduce a concentration of particulates in the wastesolution by using a hydrocyclone, a backflushing filter, a centrifuge, a filter-cartridge, a screen-filter, and/or a disk-filter. The particulates removed may be soot, $PM_{2.5}$, $PM_{10}$, unburned fuel, partially combusted materials, arsenic, iron, vanadium, copper, rust, and/or iron oxides. Further, the exemplary method may reduce the free phase oil in the wastesolution by using a hydrocyclone, a centrifuge, a gravity separator tank, a coalescing plate assisted oil-water separator, or the like.

In some embodiments, the hydrocarbon degrading microorganisms are halotolerant or halophilic. The microorganisms may be used to reduce a concentration of petroleum hydrocarbon or poly nuclear aromatic hydrocarbons in the received wastesolution. The contaminant concentration may be optionally measured at an outlet of the biogenerator or at an outlet of the granulated activated carbon filter. Optionally, various steps of the method may be repeated if the contaminant concentration is measured above a threshold value. For example, the step of reducing an amount of free phase oil in the wastesolution may be repeated or the step of reducing a concentration of particulates may be repeated. Further, the wastesolution may be redelivered to the biogenerator. Further, in some embodiments, the wastesolution may be redelivered to a granulated activated carbon filter.

In certain embodiments, the method may include discharging the wastesolution when the contaminant concentration in the wastesolution is below a threshold value. Optionally, the method may include the step of discharging the wastesolution to a storage container for future disposal when the wastesolution is below a threshold value. The measured contaminant concentration may be a concentration of polynuclear aromatic hydrocarbons, petroleum hydrocarbons, alcohols, aromatics, hydraulic fluids, solvents, detergents, synthetic oils, lubricants, or a combination thereof. In some embodiments, the received wastesolution may be from a shipboard EGC system and may also include bilge solution. In other embodiments, the received wastesolution may be from a terrestrial EGC system.

In another embodiment of the present invention, a scrubber solution treatment system for scrubber systems is provided. The exemplary system includes a pretreatment system and a biogenerator coupled to an outlet of the pretreatment system. The pretreatment system may be configured to pretreat received wastesolution using an oil/water separator and a particulate remover. The oil/water separator may be configured to reduce free phase oil in the received wastesolution. The particulate remover may be configured to reduce particulate concentration in the received wastesolution. The coupled biogenerator may receive the pretreated wastesolution and may be configured to culture hydrocarbon degrading microorganisms so as to reduce a concentration of emulsified oil in the received wastesolution.

Optionally, the system may include a granulated activated carbon biofilter coupled to an outlet of the biogenerator so as to receive the wastesolution and seed culture from the biogenerator. The granulated activated carbon biofilter may be configured to reduce a concentration of contaminants from the wastesolution. In some embodiments, the biofilter may be configured to culture hydrocarbon degrading microorganisms on the granulated activated carbon such that the culture reduces a concentration of emulsified oil in the wastesolution.

The particulate remover of the pretreatment system may be a hydrocyclone, a backflushing filter, a centrifuge, a filter-cartridge, a screen filter, a disk-filter or a combination thereof. The oil/water separator of the pretreatment system may be a hydrocyclone, a centrifuge, a gravity separator tank, or a coalescing plate assisted oil/water separator.

Optionally, the scrubber solution treatment system may include a monitor coupled to an outlet of the biogenerator so as to monitor the wastesolution at the biogenerator outlet. The monitor may be configured to measure a contaminant concentration in the wastesolution. In certain embodiments, a monitor may be coupled to an outlet of the granulated activated carbon biofilter to measure contaminant concentrations in the wastesolution after flowing through the biofilter. A pump may optionally be coupled to the outlet of the biogenerator or the biofilter so as to receive the wastesolution after the wastesolution has flowed through the biogenerator or biofilter. The pump may recirculate the wastesolution to the pretreatment system from the biogenerator or biofilter when the monitor measures a contaminant concentration in the wastesolution above a threshold value. In some embodiments, the wastesolution is recirculated to the biogenerator or biofilter. Further, the pump may optionally be configured to discharge the wastesolution from the system or to a storage container when the monitor measures a contaminant concentration in the wastesolution below a threshold value.

The scrubber solution treatment system may monitor the concentration of polynuclear aromatic hydrocarbons, petroleum hydrocarbons, alcohols, aromatics, hydraulic fluids, solvents, detergents, synthetic oils, and/or lubricants in the treated solution. In some embodiments, the wastesolution is received from a shipboard EGC system which also includes bilge solution. In other embodiments, the wastesolution is received from a terrestrial EGC system.

The system may further include a gas pump coupled to a gas inlet of the biogenerator so as to introduce gas into the biogenerator. The gas pump may be a fine bubble diffuser, a slotted pipe, a compressed gas pump, or a dissolved air floatation pump. Optionally, the system may include a nutrient pump coupled to a nutrient inlet of the biogenerator so as to introduce nutrients into the biogenerator. The nutrients may be configured to support the growth of cultured microorganisms.

In yet another embodiment of the present invention, a solution treatment system for use with a shipboard EGC system is provided. The system includes a biogenerator configured to receive wastesolution and configured to culture hydrocarbon degrading microorganisms. The biogenerator includes a wastesolution inlet for receiving wastesolution; a gas inlet for receiving gases to support the growth of cultured hydrocarbon degrading microorganisms; and a nutrient inlet for receiving nutrients into the biogenerator to support the growth of cultured hydrocarbon degrading microorganisms. The wastesolution treatment system further includes a biofilter coupled to an outlet of the biogenerator so as to receive wastesolution from the biogenerator. The biofilter includes a matrix of granulated activated carbon which is configured to reduce a contaminant concentration level in the received wastesolution. A monitor may be coupled to an outlet of the biofilter so as to receive wastesolution from the biofilter. The monitor may measure the contaminant concentration level in the received wastesolution. The system may include a pump coupled to the outlet of the biofilter. The pump may be configured to discharge wastesolution received from the biofilter out of the wastesolution treatment system when the monitor measures the contaminant concentration level below a threshold value and may be further configured to recirculate the wastesolution received from the biofilter to the biogenerator when the monitor measures the contaminant concentration level above a threshold value. Alternatively, the pump may be configured to discharge wastesolution received from the biofilter to a storage tank for later disposal when the contaminant concentration level is measured below the threshold value. In some embodiments, the wastesolution may include scrubber wastesolution and bilge solution.

DETAILED DESCRIPTION OF THE INVENTION

Figure 1:
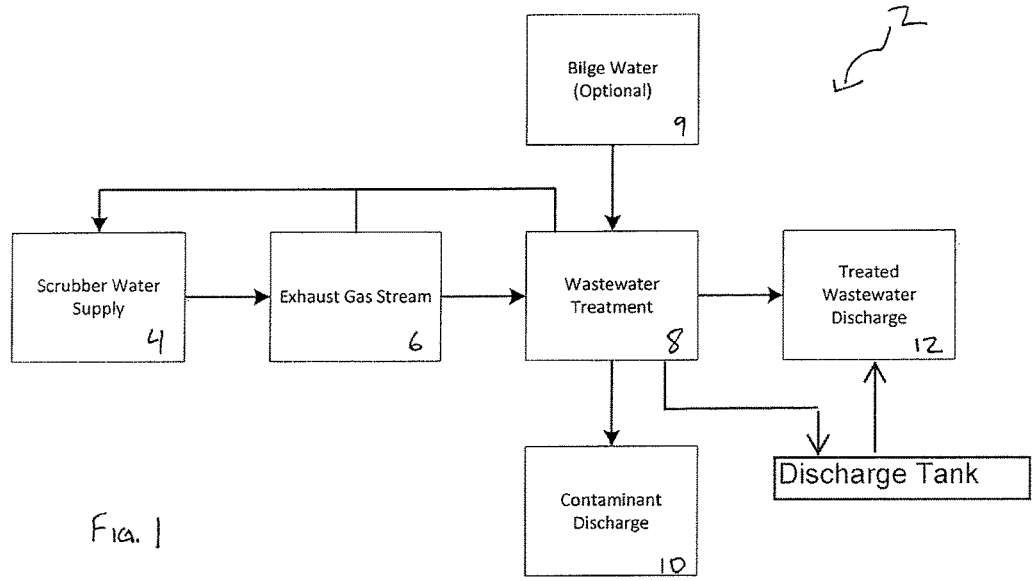
FIG. 1 depicts an exemplary modified system according to some embodiments of the present invention.

In the following description, various embodiments of the present invention will be described. For purposes of explanation, specific configurations and details are set forth in order to provide a thorough understanding of the embodiments. However, it will also be apparent to one skilled in the art that the present invention may be practiced without the specific details. Furthermore, well-known features may be omitted or simplified in order not to obscure the embodiment being described.

Embodiments of wastesolution treatment systems and methods may be used to treat various types of solution such as scrubber wastesolution or bilge solution. The system components and size may vary depending on, for example, the intended use, the amount of solution being treated, and the types of contaminants being treated. Although embodiments described herein are generally directed to treating scrubber wastesolution for EGC systems, it should be understood that there is no intention to limit the invention to the type of solution to be treated. Accordingly, the invention described herein should be limited only by the language of the claims.

As noted above, embodiments of the present invention may be particularly advantageous for treating scrubber wastesolutions produced, for example, in a wet scrubbing process wherein a scrubbing solution is utilized to wash materials, such as pollutants, from a gas stream. Certain embodiments of the methods and/or the systems of the present invention comprise methods and/or systems for the physical separation of petroleum hydrocarbons ("PHCs") from scrubber wastesolutions and subsequent microbiological remediation of the petroleum and the biodegradable materials in the scrubber wastesolution. Some embodiments of the present invention may be used with existing exhaust gas cleaning ("EGC") systems. A biogenerator with hydrocarbon degrading microorganisms may be utilized to reduce the amount of emulsified hydrocarbons in the wastesolution.

In some embodiments, it may be preferable to utilize a granulated activated carbon ("GAC") biofilter to reduce the amount of contaminants in the scrubber wastesolution. The GAC biofilter may also utilize hydrocarbon degrading microorganisms to reduce the amount of emulsified oil in the scrubber wastesolution.

In some embodiments of the present invention, the systems and methods may be used in terrestrial EGC systems. In further embodiments, the systems and methods may be used in a shipboard or maritime EGC system. Further, some systems and methods may be used to treat scrubber wastesolution and bilge solution on board a maritime vessel.

For example, an embodiment of the present invention may be provided for use with a shipboard EGC system. The scrubber wastesolution treatment system may receive scrubber wastesolution containing pollutants. The pollutants may include PHCs, polynuclear aromatic hydrocarbons ("PAHs"), and particulate matter ("PM"). The scrubber wastesolution treatment system may utilize an oil/water separator to remove free phase oil from the scrubber wastesolution. The scrubber wastesolution treatment system may also use a particulate remover such as a hydrocyclone to remove particulates from the scrubber wastesolution. The wastesolution may then be flowed through a biogenerator which cultures hydrocarbon degrading microorganisms. The microorganisms may reduce the amount of emulsified oil in the wastesolution. This particular embodiment may also utilize a GAC biofilter. The GAC may reduce the concentration of contaminants in the wastesolution. The GAC biofilter may also culture hydrocarbon degrading microorganisms on the irregular surface of the GAC to further reduce the amount of emulsified hydrocarbons in the wastesolution. In certain embodiments, halotolerant or halophilic microorganism cultures may be preferred because the initial scrubber solution may be ocean water or other water with high salt content. Further, the exemplary embodiment may be configured to treat bilge solution in a similar fashion. After treating the solution, some embodiments may safely discharge the treated wastesolution to surface water bodies, store the treated wastesolution for future disposal or recirculate the treated wastesolution back into the EGC system. The contaminants removed by the particulate remover and the oil/water separator may be separately stored for proper disposal.

Although this exemplary embodiment has been described in great detail above, many variations are available. Further features of the invention, its nature, and various advantages will be more apparent from the accompanying drawings and the following description.

An embodiment of a wastesolution treatment system of the present invention may be used with current EGC systems and methods. As an example, an exemplary modified EGC system 2 is represented at a high level in FIG. 1. Referring to FIG. 1, EGC system 2 includes scrubber solution supply 4, exhaust gas stream 6, wastesolution treatment 8, contaminant discharge 10, and treated wastesolution discharge 12. As shown in FIG. 1, scrubber solution supply 4 is coupled to exhaust gas stream 6. The scrubber solution is delivered to exhaust gas stream 6 to capture and absorb pollutants in exhaust gas stream 6. A portion of wastesolution from cleaning exhaust gas stream 6 may be recirculated back to scrubber solution supply 4 and another portion may be delivered to wastesolution treatment system 8. In some embodiments, wastesolution treatment system 8 may receive bilge solution 9. Wastesolution treatment system 8 reduces the amount of contaminants in the received solution and discharges separated contaminants in contaminant discharge 10. Wastesolution treatment system 8 then discharges treated wastesolution to treated solution discharge 12 and/or recirculates the treated wastesolution back to scrubber solution supply 4. The treated wastesolution discharge 12 may optionally be stored in wastesolution discharge 7, be recirculated back to scrubber solution supply 4, or be discharged entirely from EGC system 2 depending on the particular embodiment.

Figure 2:
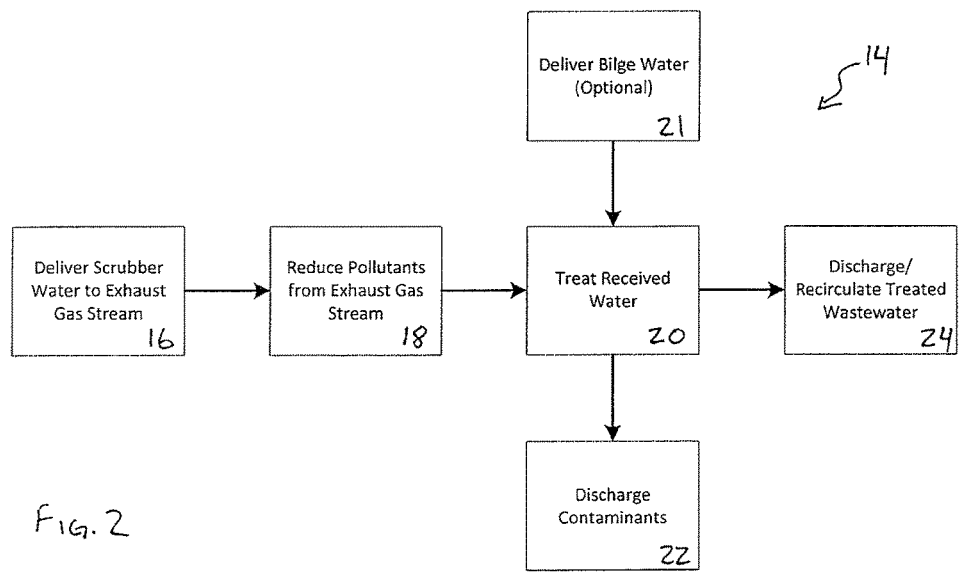
FIG. 2 depicts a flow chart representing an exemplary method exhaust gas cleaning method according to certain embodiments of the present invention.

FIG. 2 provides a high-level flow diagram of an exemplary modified process 14 used in EGC system 2. At step 16, scrubber solution is delivered to the exhaust gas stream. In some embodiments the scrubber solution may be delivered as a fine mist into the exhaust gas stream. In certain embodiments the exhaust gas stream may be passed through a pool of the scrubber solution. At step 18, the scrubber solution contacts the pollutants in the exhaust gas stream. The scrubber solution may capture and adsorb particulates and gaseous pollutants. At step 20, after the scrubber solution captures and adsorbs the pollutants from the exhaust gas stream, the scrubber wastesolution is treated. In some embodiments, where bilge treatment system and scrubber solution treatment system are combined, bilge solution may be delivered 21 for treatment 20. The received solution may be treated by removing contaminants and solid pollutants from the wastesolution. The separated contaminants may be discharged 22 and may be stored separately for proper disposal. The treated wastesolution may then be safely discharged 24 where it may be removed from the system, stored for later disposal, or may be recirculated and reused in the EGC system depending on the particular embodiment.

In some embodiments, EGC system 2 and modified process 14 may be used in terrestrial exhaust gas streams to limit the pollutants released into the air and to limit the pollutants released into the ground waters. In other embodiments, EGC system 2 and modified process 14 may be used on board a maritime ship to limit pollutants from internal combustion machinery from entering the open surface waters. In further embodiments, EGC system 2 and modified process 14 may be used on board a maritime ship to reduce the concentration of pollutants in bilge solution and/or scrubber wastesolution. The modified systems and methods may be open loop, closed loop, or hybrid systems. For example, in some embodiments wastesolution treatment system 8 recirculates treated wastesolution back to scrubber solution supply 4. In some embodiments, particularly shipping vessel EGC systems, treated wastesolution discharge 12 may be discharged to open waters. In some embodiments, treated wastesolution discharge 12 may be stored in separate discharge tank 7 for future disposal. Similarly, contaminant discharge 10 may store separated contaminants for future disposal.

Scrubber solution supply 4 may comprise sea water when EGC system 2 is onboard a maritime ship. Alternatively, scrubber solution supply 4 may be a freshwater source supplemented with an alkaline or caustic additive such as sodium hydroxide. The alkaline additive may assist in neutralizing pollutants from exhaust gas stream 6. Exhaust gas stream 6 may be from various types of combustion processes, chemical processes, or mechanical processes.

Exhaust gas stream 6 may be polluted with nitrous oxide ($NO_x$), sulfur oxide ($SO_x$), and ozone depleting pollutants. In some embodiments, exhaust gas stream may include particulate pollutants as well. For example, exhaust gas stream 6 of a ship's internal combustion engine may comprise sulfur oxides of approximately 95% sulfur dioxide and about 5% sulfur trioxide. Additionally, soot, dust, unburned fuel, and other particulates may be present in the exhaust gas stream. Some diesel engine emissions may contain approximately 3.21 g/kW·hr of particulate matter. In some embodiments the scrubber wastesolution may contain approximately 58% of these particles.

Embodiments of the present invention may be directed to systems and methods for treating scrubber wastesolution. In some embodiments, bilge solution may also be treated using systems and methods of the present application. For example, in some embodiments, wastesolution treatment system 8 and treatment step 20 of process 14 may reduce the amount of petroleum hydrocarbons, polynuclear aromatic hydrocarbons, alcohols, aromatics, hydraulic fluid, solvents, detergents, synthetic oils and/or lubricants in received wastesolution. In some embodiments, the scrubber wastesolution may include 400 ppm of unburned hydrocarbons and 16.5 ppm PAHs. Wastesolution treatment system 8 and treatment step 20 of process 14 may be configured to remove particulates from the scrubber wastesolution. For example, soot, fine particles ($PM_{2.5}$), coarse particles ($PM_{10}$), unburned fuel, partially combusted materials, arsenic, iron, copper, rust and iron oxides may be removed from the received solution. Some embodiments may remove approximately 90-95% of the particulates above 10 μm and approximately 20%-50% of the particulates between 1 and 10 μm. Treatment system 8 and treatment step 20 are discussed further with FIG. 3 and FIG. 4 below.

Figure 3:
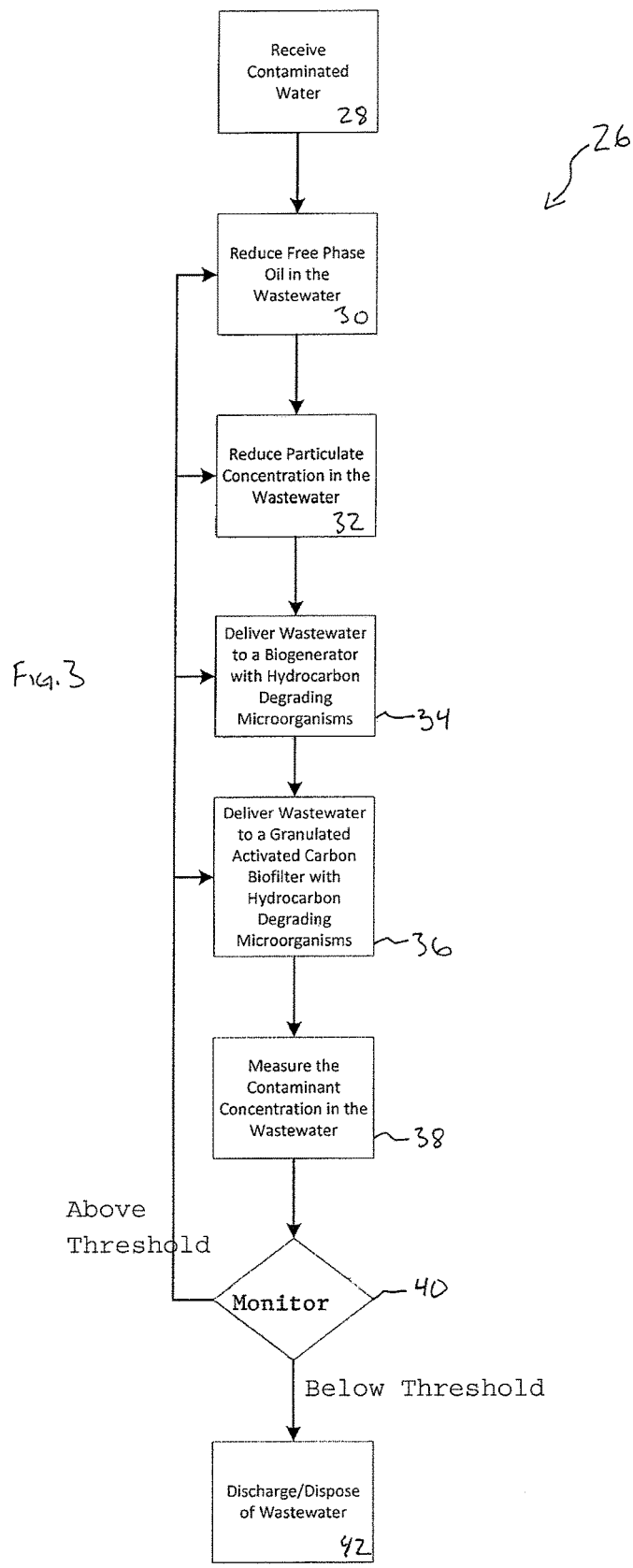
FIG. 3 depicts an exemplary method of treating wastesolution according to some embodiments of the present invention.

FIG. 3 provides an exemplary method 26 of treating solution 20 according to some embodiments of the present invention. At step 28, scrubber wastesolution and/or bilge solution is received from EGC system 2. At step 30, the free phase oil is reduced in the received solution(s). At step 32, the particulate concentration in the solution is reduced. After the particulate concentration is reduced, the solution may be delivered into a biogenerator with hydrocarbon degrading microorganisms 34. The hydrocarbon degrading microorganisms may reduce the amount of emulsified oil in the received solution. In some embodiments, the solution is then delivered to GAC biofilter 36. The GAC may help adsorb contaminants from the wastesolution. Additionally the GAC may culture hydrocarbon degrading microorganisms to further reduce the amount of contaminants in the received solution. At step 38, the contaminant concentrations in the solution are measured to determine whether the contaminant concentrations exceed a certain threshold 40. If the contaminant concentration exceeds a set threshold, various steps in the process may be repeated. For example, free phase oil reduction 30 and the particulate concentration reduction 32 may be repeated. Further, some embodiments may reintroduce the solution back into the biogenerator to further reduce the amount of emulsified oil in the received solution 34. In some embodiments, the solution may be recirculated to the GAC biofilter 36 so that the GAC may further absorb contaminants in the solution and the hydrocarbon degrading microorganisms may further reduce the concentration of emulsified oil. When the contaminant concentration is measured below a set threshold value, the treated solution may be discharged/disposed 42 from the treatment system. From step 42, the treated solution may be recirculated back to EGC system 2 and reused as scrubber solution, may be discharged into a storage tank for future disposal, or may be discharged entirely from the EGC system 2.

Figure 4:
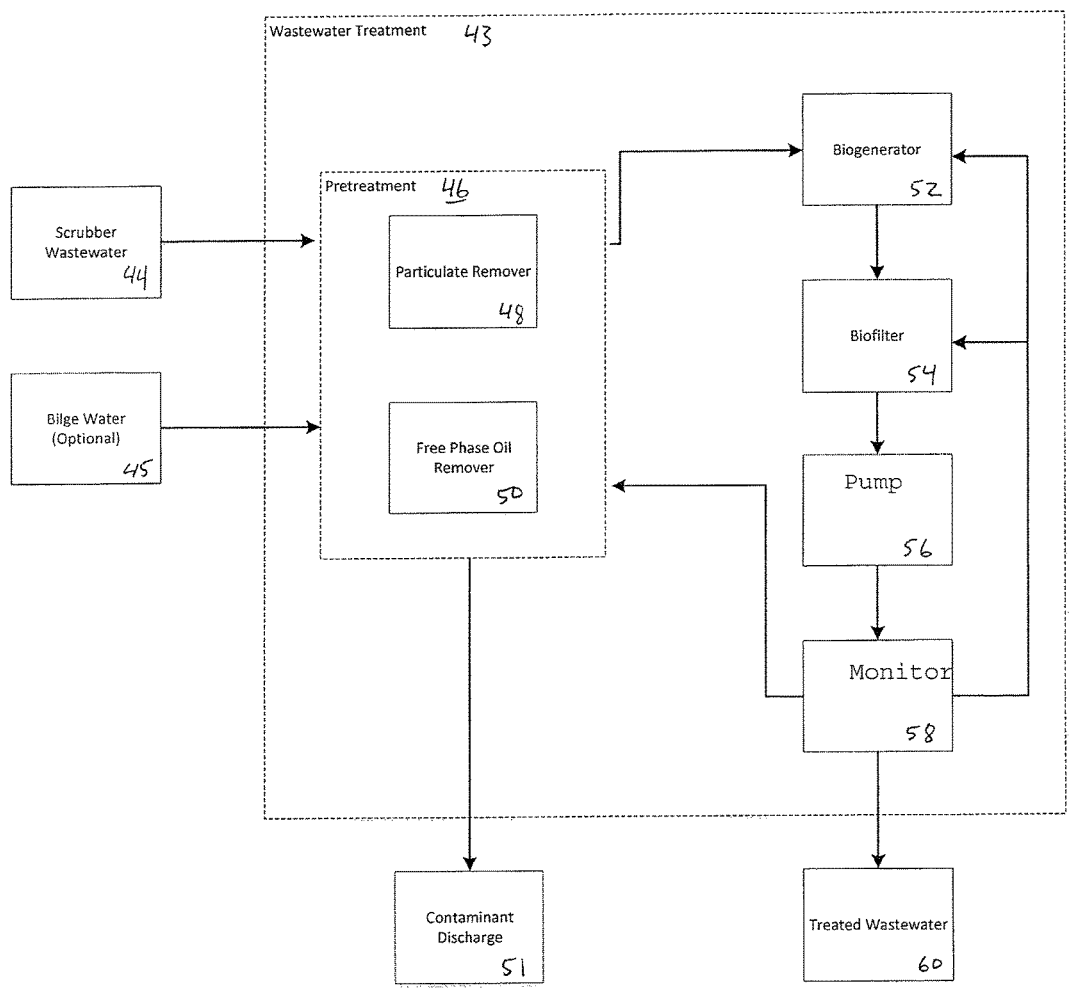
FIG. 4 illustrates an exemplary embodiment of a wastesolution treatment system.

FIG. 4 depicts an exemplary wastesolution treatment system 43. In this particular embodiment, scrubber wastesolution 44 and bilge solution 45 may be received by pretreatment system 46. Pretreatment system 46 includes particulate remover 48 and free phase oil remover 50 which reduce the concentration of particulates and free phase oil in received wastesolution 44 and/or bilge solution 45. Separated particulates and free phase oil may be discharged from the system and stored in a separate container 51 for future disposal. Pretreatment system 46 is coupled to biogenerator 52 so as to provide pretreated wastesolution to biogenerator 52. Biogenerator 52 may utilize a fixed film culture of hydrocarbon degrading microorganism to reduce the concentration of emulsified oil in the scrubber wastesolution 44 and/or bilge solution 45. Biofilter 54 may be coupled to an outlet of biogenerator 52. Biofilter 54 may utilize GAC to reduce the concentration of contaminants in scrubber wastesolution 44 and/or bilge solution 45. Additionally, biofilter 54 may culture hydrocarbon degrading microorganisms on the irregular surfaces of the GAC to further reduce the amount of emulsified oils in scrubber wastesolution 44 and/or bilge solution 45. After the received wastesolution has been treated, the contaminants may be measured. Pump 56 and monitor 58 may direct the treated wastesolution according to the measured concentration of contaminants. Monitor 58 is coupled to an outlet of biofilter 54 so as to measure the concentration of contaminants in the treated wastesolution. The wastesolution may be discharged from the system when the contaminant concentrations are below a threshold value. The treated wastesolution 60 may be recirculated back into the EGC system and reused as scrubber solution. For example, in some embodiments used onboard maritime vessels, the treated wastesolution may be safely discharged overboard. If the measured concentrations of contaminants are above a threshold value, pump 58 may redirect the scrubber wastesolution to pretreatment system 46, biogenerator 52 or biofilter 54 for further treatment.

As set forth above, in some embodiments, oil may be physically separated and removed from the scrubber wastesolution using an oil/water separator 50. Separator 50 may comprise API oil-water separators, hydrocyclones, oleophilic filters, coalescing resin beads or other coalescing media, fiberglass filters, hollow fiber membranes, or flocking particles to separate oil from the wastesolution. These separator systems 50 may be used individually or in combination to separate petroleum products from the scrubber wastesolution. An oil/water separator may reduce the amount of hydrocarbons in the wastesolution before the wastesolution reaches the biogenerator. This may be preferable because high levels of hydrocarbons in the wastesolution may be toxic or indigestible to microorganisms.

In other embodiments, particulate remover 48 may be used to remove solids from the wastesolution. Particulate remover 48 may be a hydrocyclone, a backflushing filter, a screen-filter, a centrifuge, a filter-cartridge, and a disk-filter. Particulate remover 48 may remove soot, fine particles ($PM_{2.5}$), coarse particles ($PM_{10}$), unburned fuel, partially combusted materials, arsenic, iron, copper, rust and iron oxides from the wastesolution. The particulates and free phase oil removed from the wastesolution by oil/water separator and particulate remover may be discharged and stored separately for proper disposal.

Biogenerator 52 may be used in some embodiments of the invention to reduce the amount of emulsified oil in the scrubber wastesolution and/or bilge solution. Scrubber wastesolution and bilge solution may have high concentrations of emulsified oil for various reasons. In some embodiments, the received solution may include emulsified oil due to the presence of engine-cleaning detergents, engine oil and jacket water additives, and other substances that emulsify oil into the received solution. In other embodiments, the solution may include emulsified oil due to pumping systems and other mechanical agitations which facilitate oil emulsification into the aqueous phase. Biogenerator 52 may utilize hydrocarbon degrading microorganisms to reduce the amount of emulsified oil in the wastesolution. Such microorganisms may reduce the concentration of PHCs and PAHs in the wastesolution. A fixed film biogenerator 52 may be used in some embodiments where the wastesolution is continually removed from the system to ensure that the hydrocarbon degrading microorganisms remain present in the system. Certain embodiments may use a PVC type matrix composition. In other embodiments, the matrix may comprise plastic, metal ceramic, glass, or other suitable material for the adherence of microorganisms. In some embodiments, biogenerator 52 may use top-down flow through the reactor. The retention time may depend on the concentration and types of contaminants in the wastesolution. The mineralization process may begin in biogenerator 52 where more simple hydrocarbons are oxidized into harmless end products. Microbes may be initially inoculated in the reactor and left to populate the media. During operation, the microbes may continually replenish themselves in the reactor while some of them may slough off the media. The microbes that do slough off the fixed film media may be used as seed microbes that may be used to inoculate and colonize a coupled GAC biofilter.

As set forth above, in some embodiments, GAC biofilter 54 may be used to reduce the amount of contaminants in the wastesolution. Some of the longer chain hydrocarbons and heavier molecular weight PAHs may enter GAC biofilter 54 where these pollutants may be attracted to the irregular shape of the GAC. GAC may absorb many types of pollutants and chemicals in the wastesolution including PAHs and PHCs. Additionally some embodiments may utilize a GAC biofilter 54 cultured with hydrocarbon degrading microorganisms. The microorganisms could grow on the irregular surface of the GAC and could metabolize adsorbed oils on the GAC. The continuous adsorption of hydrocarbons on the GAC may provide a continuous food supply for the hydrocarbon degrading microorganisms. Further, the microorganism degradation of oils adsorbed on the GAC may also extend the life of GAC. Thus biofilter 54 may reduce GAC matrix replacement and thereby reduce treatment interruptions, labor, and material costs.

In some embodiments, halotolerant or halophilic hydrocarbon degrading microorganisms are cultured in the biogenerator 52 and/or the biofilter 54. The microorganisms may be developed from the natural selection of microbes that have been proven to degrade petroleum components in bench-scale operations in high salinity environments. These embodiments may be particularly effective in maritime EGC systems which utilize ocean saltwater as scrubber solution.

In certain embodiments, the biogenerator and/or biofilter may include a nutrient pump which continually delivers beneficial nutrients to the hydrocarbon degrading microorganisms. The nutrient pump may be automated to help maintain an optimal environment for sustaining a hydrocarbon degrading microorganism culture. In further embodiments, a biogenerator and/or biofilter may include a gas inlet coupled to a gas pump which delivers beneficial gases to the hydrocarbon degrading microorganisms. The gas pump may be a fine bubble diffuser, a slotted pipe, a compressed gas pump, or a dissolved air floatation pump. The gas pump may similarly be automated to help maintain an optimal environment for sustain a hydrocarbon degrading microorganism culture. For example, some embodiments may control nitrogen, phosphate, and/or oxygen delivery into the biogenerator and/or biofilter to better ensure that the hydrocarbon degrading microorganisms may completely metabolize petroleum hydrocarbons in the wastesolution. Biogenerator 52 and biofilter 54 may further include a pH controller which monitors and maintains pH levels between about 6 and 8 for optimizing growth conditions for some microorganisms.

In some embodiments, a monitor may be used to measure the amount of contaminants in the wastesolution after treatment. In some embodiments, the wastesolution is recirculated back into the wastesolution treatment system when the monitor detects a contaminant concentration above a set threshold. In some embodiments the wastesolution may be discharged from the system when the monitor detects a contaminant concentration below the set threshold. For example, in some embodiments, the wastesolution may be safely discharged into open waters when measured PAH concentrations are less than 50 µg/L. In further embodiments, the wastesolution may be recirculated into the EGC system when the monitor detects a contaminant concentration below the set threshold. In some embodiments the wastesolution may be directed to a storage tank for later disposal.

While the invention is susceptible to various modifications and alternative constructions, certain illustrated embodiments thereof are shown in the drawings and described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The terms "comprising," "having," "including," and "containing" are to be construed as open-ended terms (i.e., meaning "including, but not limited to") unless otherwise noted. The term connected is to be construed as partly or wholly contained within, attached to, or joined together, even if there is something intervening Recitation of ranges of values herein are merely intended to serve as a shorthand method of referring individually to each separate value falling within the range, unless otherwise indicated herein, and each separate value is incorporated into the specification as if it were individual recited herein. All methods described herein can be performed in any suitable order unless otherwise indicated or clearly contradicted by context. The use of any and all examples or exemplary language is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventor for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated or otherwise clearly contradicted by context.

What is claimed is:

1. A method of treating wastesolution from scrubber systems, the method comprising:
   (a) receiving scrubber wastesolution, wherein the received wastesolution is from a terrestrial EGC system;
   (b) reducing an amount of free phase oil in the wastesolution;
   (c) delivering the wastesolution to a biogenerator, the biogenerator utilizing cultured hydrocarbon degrading microorganisms to reduce a concentration of emulsified oil in the wastesolution, wherein the hydrocarbon degrading microorganisms are halotolerant; and
   (d) delivering the wastesolution to a granulated activated carbon filter, the granulated activated carbon filter utilizing granulated activated carbon to reduce a concentration of contaminants from the wastesolution, and wherein the granulated activated carbon is cultured with halotolerant hydrocarbon degrading microorganisms for reducing a concentration of emulsified oil in the wastesolution;
   wherein the method removes up to 95% of particulates above 10 µm and up to 50% of particulates between 1 and 10 µm and absorbs polynuclear aromatic hydrocarbons.

2. The method of claim 1, wherein the granulated activated carbon is cultured with the hydrocarbon degrading microorganisms utilized in the biogenerator.

3. The method of claim 1, wherein the amount of free phase oil is reduced by utilizing one of a hydrocyclone, a centrifuge, a gravity separator tank, and a coalescing plate assisted oil/water separator.

4. The method of claim 1, wherein the polynuclear aromatic hydrocarbon in the wastesolution are reduced to concentrations of 50 µg/L or less.

5. The method of claim 1, further comprising measuring a contaminant concentration in the wastesolution at an outlet of the biogenerator.

6. The method of claim 5, further comprising repeating at least one of steps (b)-(d) when the contaminant concentration in the wastesolution is above a threshold value.

7. The method of claim 5, further comprising discharging the wastesolution when the contaminant concentration in the wastesolution is below a threshold value.

8. The method of claim 5, wherein the contaminant concentration comprises a concentration of at least one of a petroleum hydrocarbons, alcohols, aromatics, hydraulic fluids, solvents, detergents, synthetic oils, and lubricants.

9. A scrubber solution treatment system for scrubber systems, the system comprising:
   a pretreatment system, the pretreatment system configured to pretreat received wastesolution from a terrestrial EGC system, the pretreatment system comprising:
      an oil/water separator configured to reduce free phase oil in the received wastesolution;
   a biogenerator coupled to an outlet of the pretreatment system so as to receive the pretreated wastesolution, the biogenerator configured to culture halotolerant hydrocarbon degrading microorganisms so as to reduce a concentration of emulsified oil in the received wastesolution;
   a granulated activated carbon biofilter coupled to an outlet of the biogenerator so as to receive the wastesolution and seed culture from the biogenerator, the granulated activated carbon biofilter configured to reduce a concentration of contaminants from the wastesolution and wherein the biofilter is configured to culture halotolerant hydrocarbon degrading microorganisms on the granulated activated carbon so as to reduce a concentration of emulsified oil in the waste solution and absorb polynuclear aromatic hydrocarbons; and
   wherein the system removes up to 95% of particulates above 10 µm and up to 50% of particulates between 1 and 10 µm.

10. The system of claim 9, wherein the oil/water separator comprises at least one of a hydrocyclone, a centrifuge, a gravity separator tank, and a coalescing plate assisted oil/water separator.

11. The system of claim 9, further comprising a monitor coupled to an outlet of the biogenerator so as to monitor the wastesolution at the biogenerator outlet, the monitor configured to measure a contaminant concentration in the wastesolution.

12. The system of claim 11, further comprising a pump coupled to the outlet of the biogenerator so as to receive the wastesolution after the wastesolution has flowed through the biogenerator and coupled to the pretreatment system, the pump configured to recirculate the wastesolution to the pretreatment system from the biogenerator when the monitor measures a contaminant concentration in the wastesolution above a threshold value and further configured to discharge the wastesolution from the system when the monitor measures a contaminant concentration in the wastesolution below a threshold value.

13. The system of claim 11, wherein the contaminant concentration comprises a concentration of at least one of a petroleum hydrocarbons, alcohols, aromatics, hydraulic fluids, solvents, detergents, synthetic oils, and lubricants.

14. The system of claim 9, further comprising a gas pump coupled to a gas inlet of the biogenerator so as to introduce gas into the biogenerator, the gas pump comprising one of a fine bubble diffuser, a slotted pipe, a compressed gas pump, and a dissolved air floatation pump.

15. The system of claim 9, further comprising a nutrient pump coupled to a nutrient inlet of the biogenerator so as to introduce nutrients into the biogenerator, the nutrients configured to support the growth of cultured microorganisms.

16. The system of claim 13, wherein the sequestering of polynuclear aromatic hydrocarbons reduces the polynuclear aromatic hydrocarbons in the wastesolution to concentrations of 50 µg/L or less.

* * * * *